(12) United States Patent
Soliman et al.

(10) Patent No.: US 8,241,176 B2
(45) Date of Patent: Aug. 14, 2012

(54) CONTROL OF AN ENGINE RESTART IN A HYBRID ELECTRIC VEHICLE

(75) Inventors: Ihab S. Soliman, Canton, MI (US); Ryan A. McGee, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 530 days.

(21) Appl. No.: 12/562,174

(22) Filed: Sep. 18, 2009

(65) Prior Publication Data

US 2011/0070999 A1 Mar. 24, 2011

(51) Int. Cl.
*B60W 10/08* (2006.01)
(52) U.S. Cl. .............................................. 477/21; 477/5
(58) Field of Classification Search .................. 477/5, 8, 477/10, 11, 15, 21, 94, 107, 112, 170, 175, 477/178, 181
See application file for complete search history.

(56) References Cited

U.S. PATENT DOCUMENTS

| | | | | |
|---|---|---|---|---|
| 7,041,030 | B2 * | 5/2006 | Kuroda et al. | 477/21 |
| 7,314,425 | B2 * | 1/2008 | Ito et al. | 477/5 |
| 8,062,174 | B2 * | 11/2011 | Sah et al. | 477/15 |
| 8,066,620 | B2 * | 11/2011 | Sah | 477/175 |

* cited by examiner

*Primary Examiner* — Justin Holmes
(74) *Attorney, Agent, or Firm* — David B. Kelley; MacMillan, Sobanski & Todd, LLC

(57) ABSTRACT

A method for restarting an engine in a hybrid electric powertrain includes using an auxiliary pump while the engine is shutdown to maintain stroke pressure in an oncoming transmission friction control element whose engagement is required to launch the vehicle following the restart, initiating an automatic engine restart, increasing a torque capacity of the control element while the engine is restarting, and using pressure produced by a transmission pump in the transmission to lock the control element after the engine restarts.

21 Claims, 5 Drawing Sheets

CONTROL OF AN ENGINE RESTART IN A HYBRID ELECTRIC VEHICLE

BACKGROUND OF THE INVENTION

1. Field of the Invention

This invention relates generally to a powertrain for a hybrid electric vehicle (HEV) and, more particularly, to its control during an engine restart event.

2. Description of the Prior Art

A HEV is a vehicle configured with a hybrid propulsion system that utilizes at least two different sources of torque for propelling the vehicle. As one non-limiting example, a hybrid propulsion system may combine a conventional propulsion system that includes an internal combustion engine and a stepped-ratio change automatic transmission with an electric propulsion system that includes one or more electric motors and a rechargeable energy storage device, such as an electric battery, that can power the electric motors or store energy to improve fuel economy over the conventional vehicle. A hybrid electric vehicle typically provides different powertrain operating modes with the engine running or shutdown depending on the vehicle operating conditions, battery conditions, and driver's propulsion request. Hence, one of the major functions that an HEV provides is the ability to start or stop the engine during certain conditions. When the engine is running, the electric portion of the propulsion system may also be used to assist the engine in providing the required vehicle propulsion. During the conditions when the engine is shutdown, the driver's propulsion request can be provided entirely by the electric motor.

Motor vehicles can be designed to employ certain aspects of hybrid electric technology to reduce fuel consumption, but without use of a hybrid drivetrain. In such vehicles, called micro-HEVs, shutting down the engine during conditions where the engine operates at idle speed will be used to reduce fuel consumption and reduce emissions in a conventional powertrain that includes an internal combustion engine and a step-change automatic transmission, but no electric machine for driving the wheels. The primary condition that is checked by the micro-HEV powertrain control system before stopping the engine is that the driver has applied the brakes and the vehicle is stopped since the engine would typically be idling during these conditions in a conventional vehicle. Once the driver releases the brake pedal indicating a request for vehicle propulsion, the powertrain control system will automatically restart the engine. In a micro-hybrid electric powertrain having an automatic transmission, coordinated transmission control before, during and after an engine start is critical to acceptable vehicle performance. Specifically, control of clutch torque capacity during the engine start directly controls the amount of engine torque transferred to the wheels for vehicle propulsion. Moreover, any delays in clutch torque capacity application directly result in non-responsive vehicle propulsion and poor vehicle performance. Furthermore, in vehicle applications using a dual-clutch automatic transmission without a torque converter, often called a powershift transmission, any excessive and non-coordinated clutch torque capacity control during an engine start can potentially lead to engine stall and/or rough creep and launch performance.

One method commonly applied to address these issues simply keeps the transmission fully in gear whenever the gear range selector lever, i.e., the gear lever, is in a drive position, which may include DRIVE, REVERSE, MANUAL range positions. This technique, often referred to as Start-In-Gear (SIG), provides minimal transmission control coordination before and during the engine start since the transmission is to remain engaged in gear. Hence delayed vehicle propulsion is not be perceived by the driver.

There are deficiencies with the SIG approach such as excessive driveline excitation due to engine-start transients being transmitted to wheels since the transmission is fully engaged in gear. Furthermore, the SIG technique causes engine-start loading, since the transmission is fully engaged with its torque converter unlocked thus providing a torque flow path to the wheels. In addition, the SIG approach requires excessive electrical energy consumption, since an electric auxiliary pump must be fully activated to maintain sufficient hydraulic line pressure to keep transmission fully in gear before and during engine starts and stops for electro-hydraulically operated automatic transmissions. This results in excessive energy consumption while the engine is off.

The strategy is not applicable to dual clutch powershift automatic transmission applications without a torque converter. Finally, there is minimal or no transmission control coordination with the vehicle system and engine control under when SIG is employed.

A powertrain control system for a micro-HEV powertrain must provide an immediate response to a driver's request for vehicle propulsion when the engine is restarted. A strategy is needed to coordinate transmission and engine control during an engine start event while minimizing energy consumption in order to provide responsive, smooth, consistent and predictable vehicle propulsion performance.

SUMMARY OF THE INVENTION

A method for restarting an engine in a hybrid electric powertrain includes using an auxiliary pump to maintain stroke pressure in an oncoming transmission friction control element whose engagement is required to launch the vehicle following the restart, initiating an automatic engine restart, increasing a torque capacity of the control element while the engine is restarting, and using pressure produced by a transmission pump in the transmission to lock the control element while the engine restarts.

This control strategy uses a vehicle system controller to coordinate engine and transmission control during an engine start event. It produces smooth driveline propulsion performance, optimizes energy consumption using a coordinated variable electric auxiliary pump control. The control strategy is applicable to both conventional automatic and dual clutch transmission technologies.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
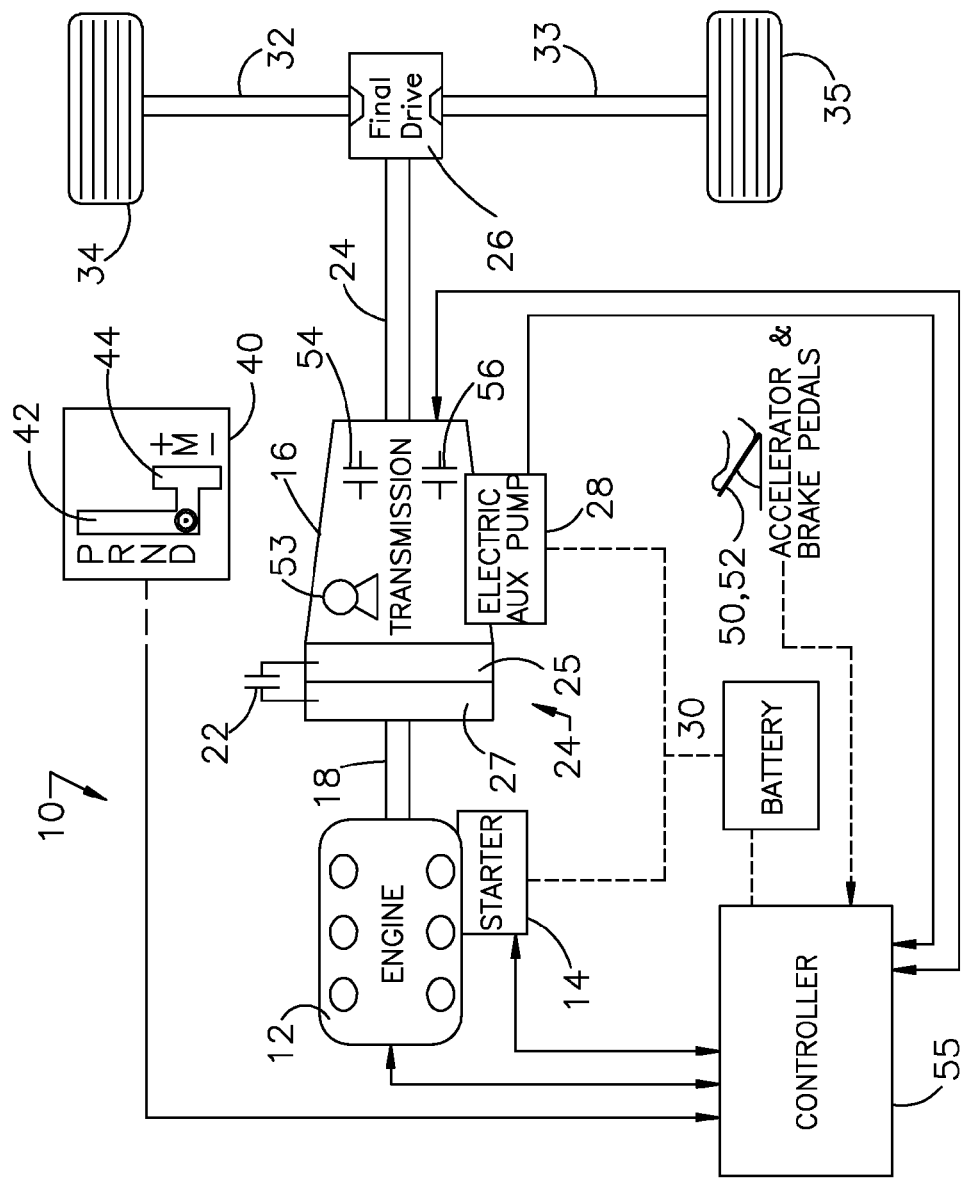
FIG. 1 is a schematic diagram of a micro-HEV powertrain.

Referring now to the drawings, the micro-HEV powertrain 10 of FIG. 1 includes a power source 12, such as an internal combustion engine; an engine starter 14; an automatic transmission 16 connected by an input shaft 18 to the engine; an electric auxiliary hydraulic pump (EAUX) 28, whose output pressurizes the hydraulic system of the transmission; an electric storage battery 30, which supplies electric power to the pump 28 and starter 14; driveshaft 24; final drive mechanism 26; and axle shafts 32, 33 driveably connected to the driven wheels 34, 35.

The transmission 16 may be a hydraulically actuated automatic transmission having a torque converter 24, which includes an impeller 27 connected to the engine and a turbine 25 hydrokinetically driven by the impeller and a bypass clutch 22, which selectively driveably connects the turbine to the impeller. Alternatively, the transmission may be powershift automatic transmission, in which dual clutches produce a drive connection between the engine and the transmission input.

A gear shifter 40 is moved manually by the vehicle operator among (P)ark, (R)everse, (N)eutral, and (D)rive range positions in an automatic mode channel 42 and between upshift (+) and downshift (−) positions in a manual mode channel 44.

Accelerator and brake pedals 50, 52, controlled manually by the vehicle operator, provide input demands to a control system for changes in engine wheel torque and changes in brake force, respectively.

Located within transmission 16 are friction control elements, i.e., clutches and brakes, whose state of coordinated engagement and disengagement produce the forward gears and reverse gear. The first forward gear, low gear, is produced when at least one, but preferably two of the friction control elements 54, 56 are engaged concurrently. The transmission friction control elements, whose engagement produces the desired gear in which the vehicle will be launched, are often referred to as launch control elements 54, 56. Hydraulic line pressure produced by the electric auxiliary pump 28 while the engine 12 is shutdown is used to fill and stroke the launch elements 54, 56, thereby preparing the transmission 16 for responsive torque transmission once the engine restart is completed. Stroking the launch control elements 54, 56 takes up clearances between the servo pistons and a pack of friction plates in the control elements, and clearances among the friction plates. The launch elements 54, 56 have substantially no torque transmitting capacity when stroke pressure is present in the servo cylinders that actuate the launch elements.

Transmission 16 also contains a hydraulic pump 53, such as a gerotor pump, whose output is used to produce line pressure in the transmission's hydraulic circuit when the engine is running, through which the control elements 54, 56 are pressurized to a state of full engagement in coordination with the engine restart method. The electric auxiliary pump 28 pressurizes the transmission's hydraulic circuit when the engine is not running.

A microprocessor-based controller 55, accessible to a restart control algorithm, communicates through electronic signals transmitted on a communication bus with the engine 12, starter 14, transmission 16, gear selector 40, auxiliary pump 28, gear shifter 40, and the accelerator and brake pedals 50, 52.

Figure 2:
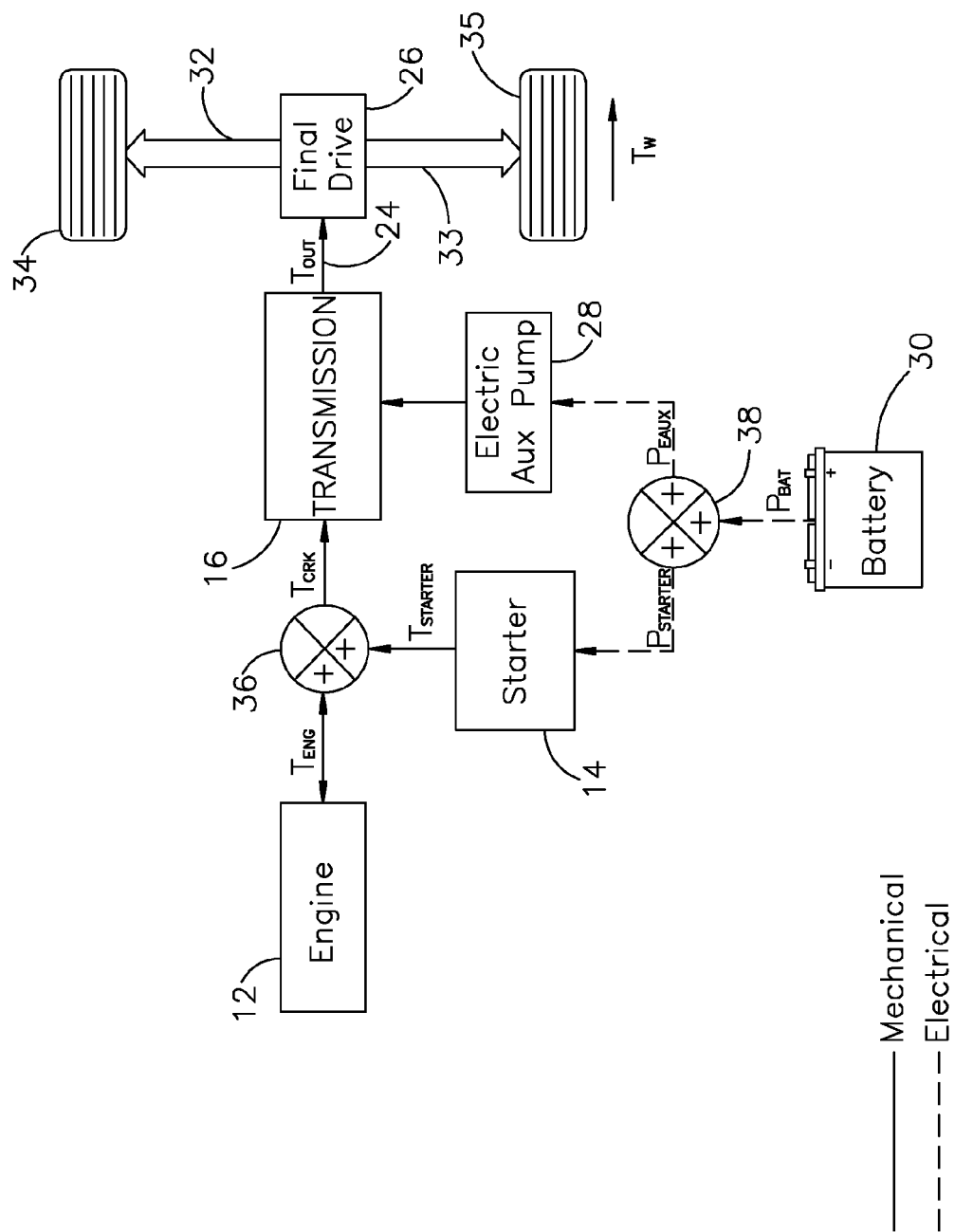
FIG. 2 is schematic diagram showing the power and energy flow in the powertrain of FIG. 1.

FIG. 2 shows that engine output torque $T_{ENG}$ and torque $T_{STARTER}$ produced by the starter motor 14 are combined at a junction 36 to produce engine crankshaft torque $T_{CRK}$. Transmission output torque 24 $T_{OUT}$ is transmitted from the transmission 16 to the final drive 26, which includes an interwheel differential mechanism. Electric power from battery 30 $P_{BAT}$ is supplied to a junction 38, from which electric power $P_{EAUX}$ is distributed to the EAUX 28 and starter motor power $P_{STARTER}$ is distributed to the starter 14. Torque $T_{OUT}$ at the transmission output 24 is transmitted to the final drive and differential 26 through axle shafts 32, 33 which drive wheels 34, 35.

A comprehensive powertrain control strategy coordinates transmission and engine control before, during and following an engine restart in order to provide smooth driveline propulsion performance and minimal energy consumption.

The control architecture for this strategy includes a vehicle system controller 55, which determines an engine start/stop request based on driver input or other system inputs in addition to coordinating transmission and engine control. The vehicles system controller 55 coordinates engine and transmission control using operating mode requests and status feedbacks from each powertrain subsystem.

Furthermore, the vehicle system controller 55 uses the four primary powertrain operating modes shown in FIGS. 3-6 for a powertrain control strategy during an engine restart.

Figure 3:
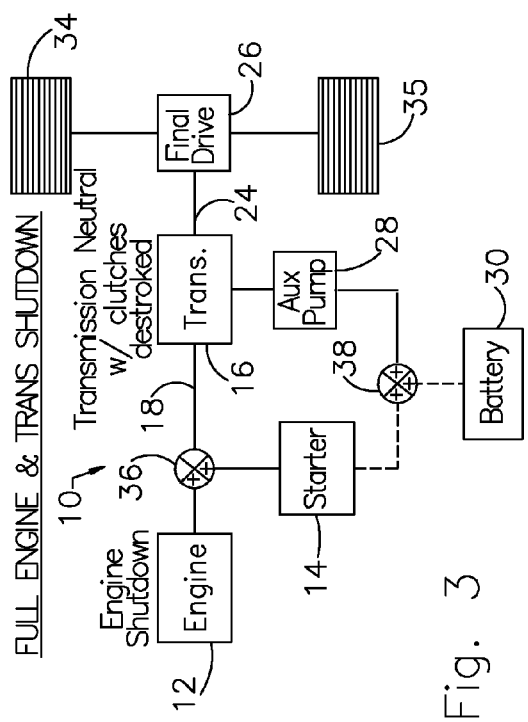
FIG. 3 is a schematic diagram showing the engine and transmission shutdown operating mode.

During a first powertrain operating mode illustrated in FIG. 3, the engine 12 is initially shutdown and the transmission 16 is fully disengaged, i.e., the hydraulically actuated clutches and brakes, whose coordinated engagement and disengagement produce the various transmission gear ratios, are fully disengaged or destroked and the transmission 16 produces no output torque $T_{OUT}$. This operating mode is primarily used when the gear lever position is in PARK/NEUTRAL and while the engine is stopped. Note, in this operating mode the transmission has no source of hydraulic line pressure as the engine 16 is stopped and the electric auxiliary pump 28 is off.

Figure 4:
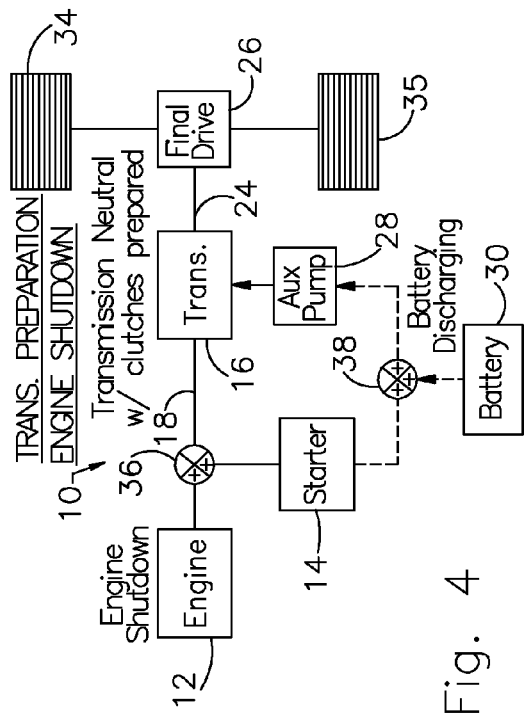
FIG. 4 is a schematic diagram showing power flow in the transmission preparation operating mode.

A second powertrain operating mode shown in FIG. 4 (see Figure notes) is a powertrain standby operating mode used by the control strategy to activate the electric auxiliary pump 28 while engine 12 is stopped or stopping so that the transmission 16 can be operated in a standby mode, fully ready to transmit torque. While the transmission 16 is in a standby mode, it transmits no output torque $T_{OUT}$ (neutral), but any oncoming friction control elements 54, 56 are hydraulically filled and stroked with zero torque capacity.

If the control strategy is applied to a dual-clutch transmission, the gearbox 16 would be engaged in gear while the corresponding input clutch is stroked with zero torque capacity. The vehicle system controller initiates this powertrain operating mode when the gear lever 40 is shifted into a drive position (DRIVE, REVERSE, MANUAL, etc.) while the engine is stopped.

The vehicle system controller 55 produces command signals that produce the standby mode, wherein transmission 16 is prepared to transmit torque while keeping the engine stopped. In this way, before an engine start is initiated, the transmission 16 is controlled in the standby mode by having the oncoming clutches 54, 56 stroked with zero torque capacity using the electric auxiliary pump 28 to provide hydraulic line pressure to actuate the oncoming control elements. During the powertrain standby operating mode, the transmission 16 uses minimal auxiliary line pressure sufficient to only fill and stroke the oncoming clutches while the transmission is in a neutral state, thus minimizing energy consumption.

Figure 5:
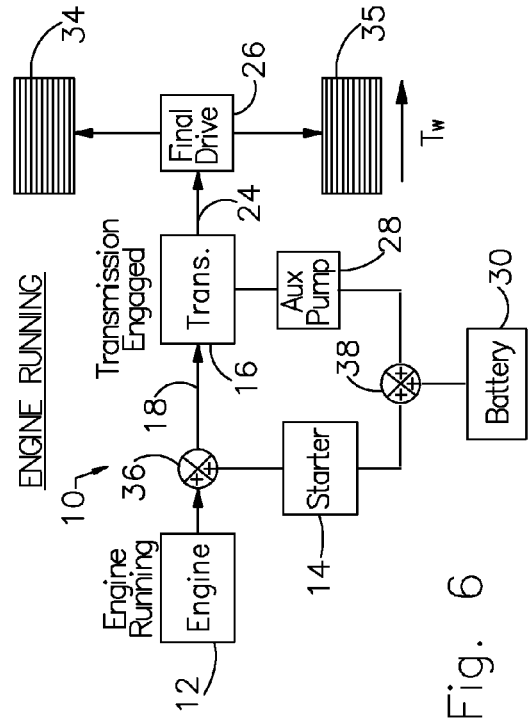
FIG. 5 is a schematic diagram showing power flow in the clutch slip control operating mode.

Once the vehicle system controller 55 determines that the engine 12 is to be started and vehicle propulsion is requested by the driver (as when the vehicle operator releases brake pedal 52 while the vehicle is stopped), a third powertrain operating mode, clutch slip control during engine restart, illustrated in FIG. 5, is used. In this operating mode, vehicle propulsion is produced during the engine restart while minimizing driveline excitation by increasing the torque capacity of the oncoming control element 54, 56, i.e., while slipping the oncoming clutch such that no solid driveline connection between the engine and wheels is made.

This is accomplished using closed-loop clutch slip control by modulating clutch torque capacity until the engine 16 is running. By applying some clutch torque capacity during the engine restart, vehicle propulsion delays are minimized.

During the clutch slip control operating mode, pressure produced by the electric auxiliary pump 28 is increased in coordination so that the torque capacity of the oncoming clutch 54, 56 is increased sufficiently.

Figure 6:
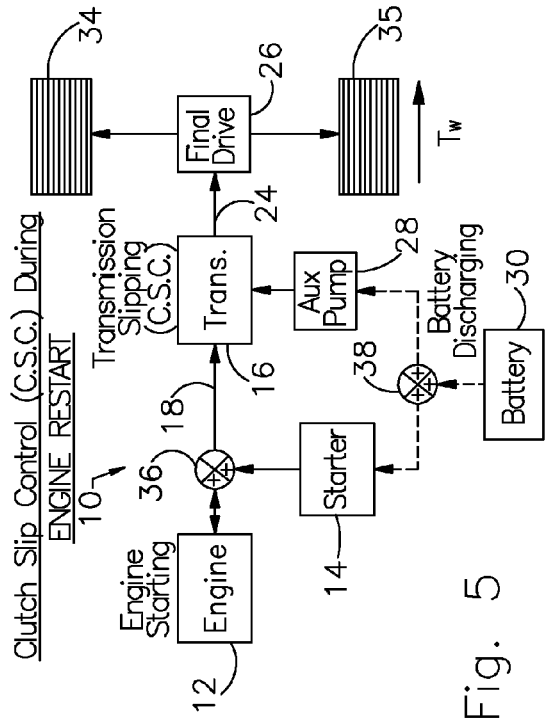
FIG. 6 is a schematic diagram showing power flow in the engine running operating mode.

When engine 12 is restarted and running, vehicle system controller 55 used the fourth, engine running operating mode, shown in FIG. 6. Transmission 16 is fully engaged and transmits all the engine torque to the wheels 34, 35. Once the engine is running, clutch slip control is stopped, and the torque capacity of the oncoming control elements 54, 56 is increased in an open-loop manner until that clutch is fully engaged. Alternatively, torque capacity of the oncoming control element 54, 56 can be applied after the engine has started in order to minimize loading to the engine and potential engine stall.

Figure 7A:
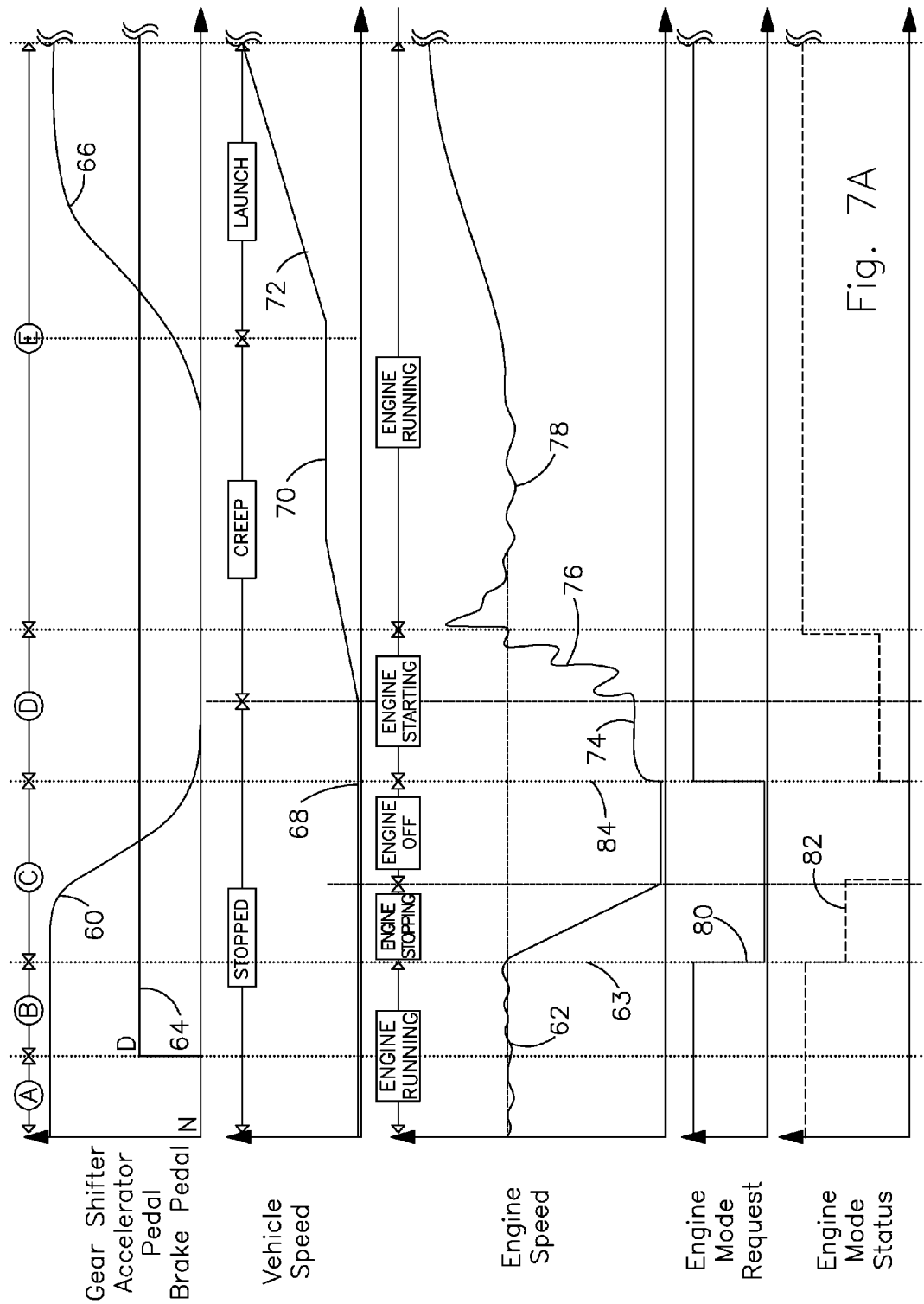
FIG. 7 is a series of graphs illustrating the change in powertrain variables during an engine restart event.
Figure 7B:
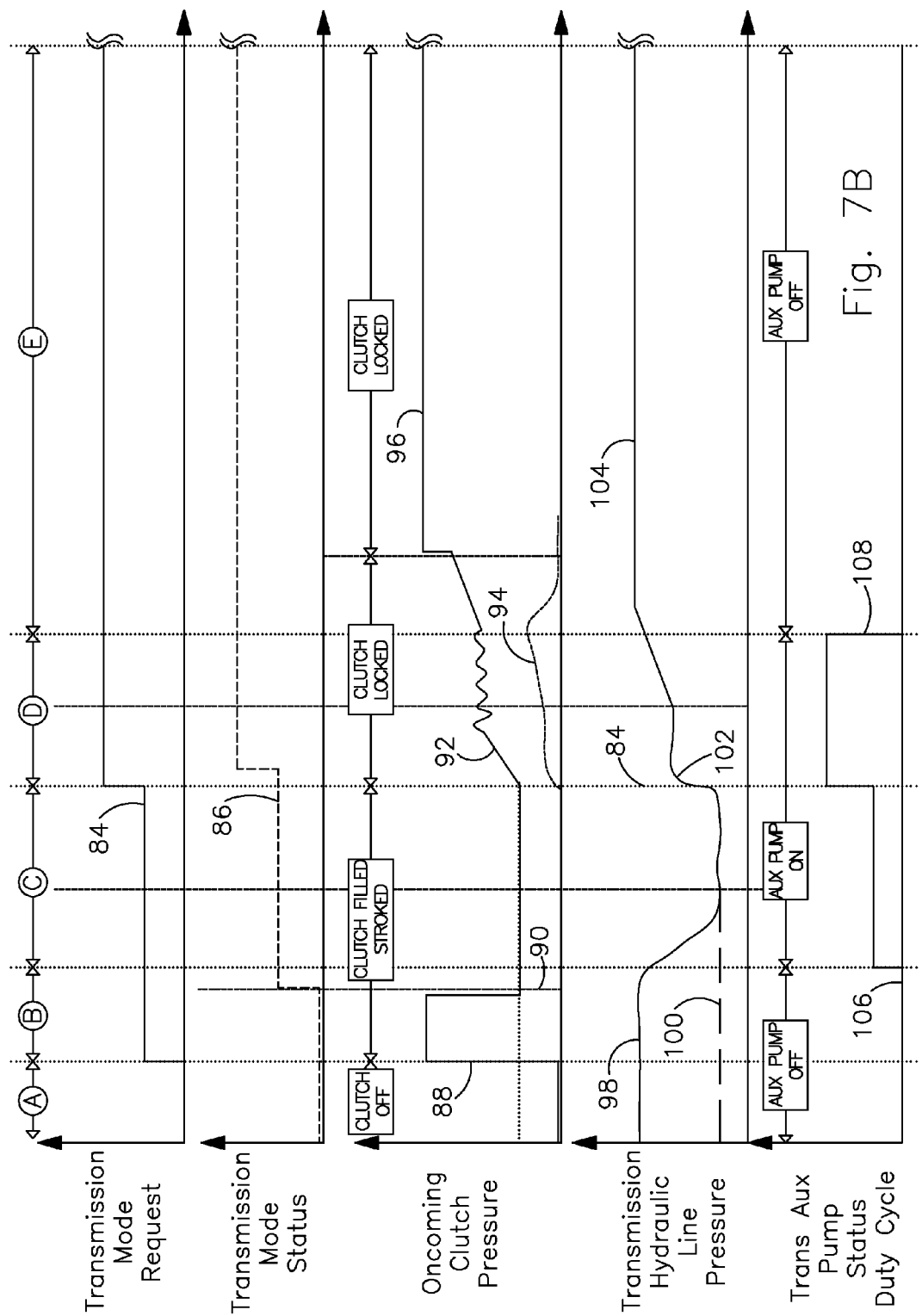

FIG. 7 illustrates the comprehensive powertrain control strategy and changes in powertrain variables during an engine restart event.

Graph 60 represents the initial release of brake pedal 52, and the distance through which the brake pedal is depressed while the vehicle and engine are stopped. The engine restart at 84 is initiated in response to release of the brake pedal 52 at 60.

Graph 64 represents position of the gear shift lever 40 which is in the (D)rive position in the automatic range during the entire restart event. Graph 66 represents the change of position of the accelerator pedal 50 following the engine restart at 84.

Graph 68, which represents vehicle speed, shows vehicle speed is zero before the engine restart, vehicle creep at 70 following the engine restart and vehicle launch acceleration 72 once the accelerator pedal 50 is depressed as shown on graph 66 once the engine is running.

Graph 62 represents engine speed steady at idle, decreasing following initiation of an engine stop at 63 and zero while the engine 12 is stopped. Graph 74 represents engine speed while starter 14 cranks the engine 12, graph 76 represents engine speed while engine combustion occurs as the engine is starting, and graph 78 represents engine speed after the restart.

Graph 80 indicates the start and stop status of engine mode requests. Graph 82 indicates the engine status, which varies among running, rotating, stopped, starting and running before, during and after the restart event.

Graph 84 indicates the status of transmission mode requests, which vary among disengage, prepare-to-engage and transmit-torque during the restart event. Graph 86 indicates the transmission status, which varies among disengaged, ready-to-be-engaged, and transmitting-torque.

Pressure in the transmission control element 54, 56 that is oncoming to produce the gear in which the vehicle is launched after the restart event is represented in graph 88. At 90, the oncoming control element is filled and pressurized to stroke pressure, at which its torque capacity is zero. When the engine restart is initiated at 84, pressure in the oncoming transmission control element 54, 56 increases at 92 with the clutch slipping at 94. When pressure in the oncoming control element 54, 56 increases sufficiently, clutch slip becomes zero and pressure is increased to 96 where the clutch is locked and pressure is controlled by line pressure above the pressure level required to hold the clutch engaged.

Graph 98 represent transmission line pressure, which decreases to the pressure 100 provided by pump 28 while the engine is stopping and remains low while the engine is stopped to keep the oncoming control element stroked with zero torque capacity. When the engine restart is initiated at 84, auxiliary pump 28 increases line pressure at 102 such that pressure in the transmission oncoming control element 54, 56 increases at 92. When sustained engine combustion occurs at 76, hydraulic pressure in the oncoming transmission control element increases to 104, which maintains the oncoming clutch 54, 56 locked.

Graph 106 shows the changing duty cycle of the auxiliary pump 28, which varies from zero to 20 percent and to more than ninety percent during the restart event. Use of the auxiliary pump 28 is discontinued when the engine 12 begins to run at 108. The transmission pump 53 is thereafter used to provide pressure to the oncoming friction control element 54, 56.

The vehicle is launched by accelerating the vehicle from a stopped or nearly stopped condition in a transmission gear, preferably first gear that requires the oncoming friction control element 54, 56 to become engaged.

In accordance with the provisions of the patent statutes, the preferred embodiment has been described. However, it should be noted that the alternate embodiments can be practiced otherwise than as specifically illustrated and described.

The invention claimed is:

1. An engine restart method for in a hybrid electric powertrain, comprising:
   (a) while the engine is stopped, using an auxiliary pump to maintain stroke pressure in an oncoming transmission friction control element;
   (b) initiating an automatic engine restart;
   (c) increasing a torque capacity of the control element while the engine is restarting;
   (d) using pressure produced by a pump in the transmission to lock the control element after the engine restarts.

2. The method of claim 1 wherein step (a) further comprises using hydraulic pressure produced by the auxiliary pump to fill, stroke and maintain stroke pressure in the control element.

3. The method of claim 1 wherein step (a) the torque capacity of the control element is substantially zero due to the stroking of the control element.

4. The method of claim 1 further comprising stopping the engine in response to depressing a brake pedal while executing step (a).

5. The method of claim 1 further comprising stopping the engine in response to releasing an accelerator pedal while executing step (a).

6. The method of claim 1 wherein step (b) further comprises initiating the engine restart in response to releasing the brake pedal.

7. The method of claim 1 wherein step (c) further comprises using the auxiliary pump and the transmission pump to increase the torque capacity of said control element while the engine is restarting.

8. The method of claim 1 wherein step (c) further comprises slipping the said control element while the engine is restarting.

9. The method of claim 1 wherein step (d) further comprises discontinuing use of the auxiliary pump.

10. A method for controlling restart of an engine in a hybrid electric powertrain, comprising the steps of:
   (a) while the engine is stopped, using an auxiliary pump to maintain stroke pressure in an oncoming transmission friction control element;
   (b) initiating the restart using a starter to crank the engine;
   (c) increasing a torque capacity of the control element while the engine is restarting;
   (d) using a pump in the transmission to lock the control element after the engine restarts;
   (e) using the engine to accelerate the vehicle in the transmission gear.

11. The method of claim 10 wherein step (a) further comprises using hydraulic pressure produced by the auxiliary pump to fill, stroke and maintain stroke pressure in the control element.

12. The method of claim 10 wherein step (a) the torque capacity of the control element is substantially zero due to the stroking of the control element.

13. The method of claim 10 further comprising stopping the engine in response to depressing a brake pedal while executing step (a).

14. The method of claim 10 further comprising stopping the engine in response to releasing an accelerator pedal while executing step (a).

15. The method of claim 10 wherein step (b) further comprises initiating the engine restart in response to releasing the brake pedal.

16. The method of claim 10 wherein step (c) further comprises auxiliary pump and the transmission pump to increase the torque capacity of said control element while the engine is restarting.

17. The method of claim 10 wherein step (c) further comprises slipping the said control element while the engine is restarting.

18. The method of claim 10 wherein step (d) further comprises discontinuing use of the auxiliary pump.

19. A hybrid electric powertrain, comprising:
   an engine;
   a transmission including launch elements whose engagement is required to launch the vehicle following an engine restart, hydraulic circuit and a pump for actuating said launch elements;
   a source of electric power;
   an auxiliary pump driven from the power source and connected to the hydraulic circuit;
   a starter driven from the power source and connected to the engine; and
   a controller configured to stop the engine, use the auxiliary pump to stroke and maintain stroke pressure in the launch control elements, use the source of electric power to actuate the starter to initiate a restart of the engine, increase a torque capacity of said control element while the engine is restarting, and use pressure produced by the transmission pump to lock the launch control elements after the engine restarts.

20. The powertrain of claim 19 wherein the controller is further configured to electrically disconnect the power source from the auxiliary pump.

21. The powertrain of claim 19 wherein the controller is further configured to stop the engine in response to a depression of a brake pedal.

* * * * *